May 15, 1945.   I. M. TERWILLIGER   2,375,962
METHOD OF PRODUCING MOTION PICTURE FILMS
Original Filed Aug. 12, 1939
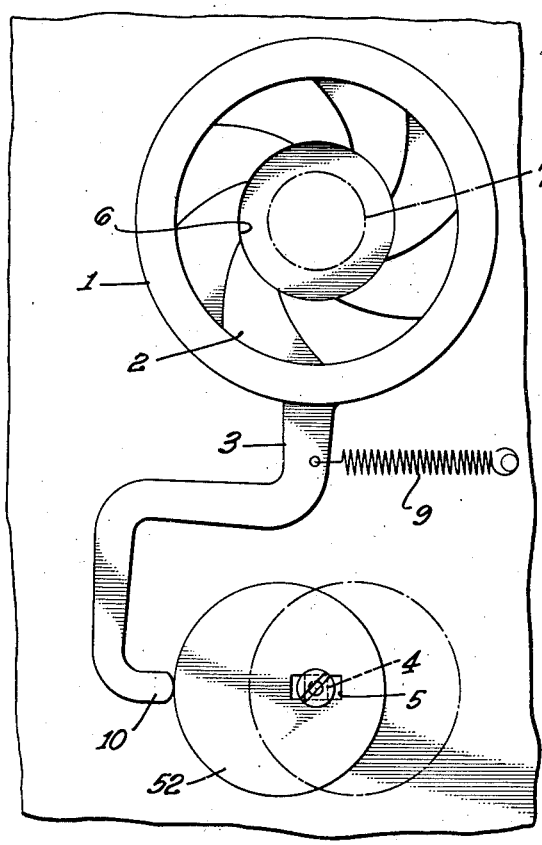
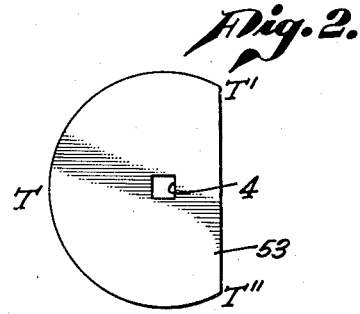
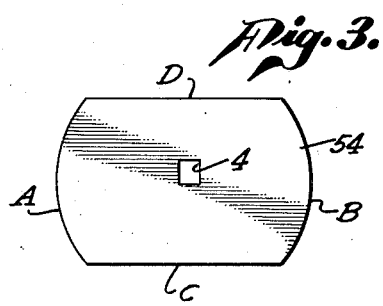
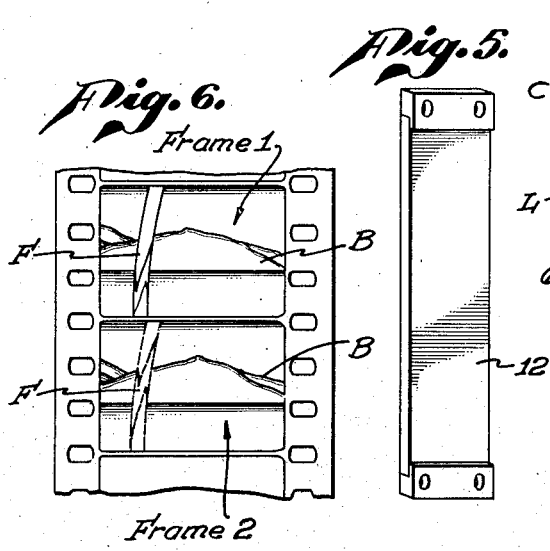
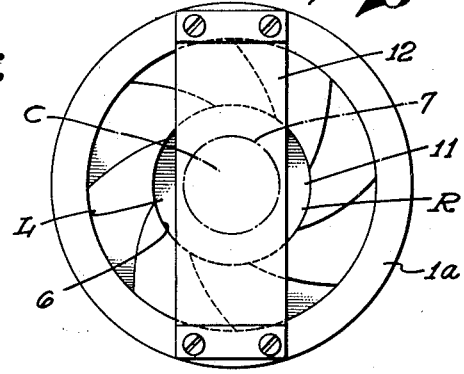
IVAN M. TERWILLIGER,
INVENTOR.
BY
ATTORNEY.

Patented May 15, 1945

2,375,962

UNITED STATES PATENT OFFICE 2,375,962

METHOD OF PRODUCING MOTION-PICTURE FILMS

Ivan M. Terwilliger, Pasadena, Calif.

Original application August 12, 1939, Serial No. 289,877, now Patent No. 2,322,752, dated June 29, 1943. Divided and this application March 29, 1943, Serial No. 480,964

8 Claims. (Cl. 88—16.6)

My invention relates generally to the art of cinematography, and more particularly to the production of pictures which, when projected upon a screen, give the illusion of depth.

This application is a division of my copending application Serial No. 289,877, filed August 12, 1939, now Patent Number 2,322,752 issued June 29, 1943, and entitled "Motion picture film" which was a continuation of my application Serial No. 183,696, filed January 6, 1938.

It is an object of my invention to provide a method of producing a film carrying a plurality of intermingled images having different depths of field, said images being arranged in various orders or combinations.

It is also an object of my invention to provide a method of producing a film in which one series of images having a certain depth of field predominate over other series of images having a different depth of field.

Some of the advantages of this type of film which I term "steropattern" include the production of the illusion of depth and plasticity of relief, increased roundness in the images, harmonious blending between images of objects at different depths of the field, and a coherent fusion of the variant aspects of the pictures seen upon projection.

It is also an object of my invention to provide a method and means of varying the iris opening, which means can be used with conventional cameras or with variable focus cameras.

Another object of my invention is to provide a film strip of the character mentioned, in which a given portion of each image is in registration with the same portion of the other images carried in other frames along said film strip.

These and other objects and advantages of my invention will become apparent from the following description of a preferred form thereof, and from the accompanying drawing illustrating that form, in which:

Fig. 1 is a front elevation of a camera lens mount and iris control means, illustrating one form of apparatus which may be used to produce the film of my invention;

Figs. 2 and 3 illustrate optional forms of cams for the apparatus of Fig. 1;

Fig. 4 is a partial front elevation of a lens mount and auxiliary optical element usable in my invention;

Fig. 5 is a perspective of said optical element; and

Fig. 6 is a fragmentary view of the film produced by my invention.

Referring to the drawing, and particularly to Fig. 1 thereof, the numeral 1 indicates a suitable frame or mount for an iris 2 of a motion picture camera, the housing of which is indicated by broken lines. The iris is disposed immediately adjacent to the lens elements of the camera, either in front or rear thereof, or at the nodal point of the lens when it comprises a plurality of elements. Examples of satisfactory extreme positions to be assumed by the iris opening in producing the film of my invention are indicated by the full line circle 6 and the dotted circle 7, the numeral 6 indicating the larger opening position and the numeral 7 indicating the smaller or contracted iris position.

The iris 2 may be provided with a control arm 3 which, in the form illustrated in Fig. 1, is provided with a contact point or finger 10 adjacent its lower end for a purpose to be hereinafter shown. The iris control arm 3 is held by a spring 9 which continually urges it against a cam 52.

The camera is provided with a shaft 4 which is connected by gears (not shown) to the main drive shaft of the camera and is synchronized with the film-advancing mechanism thereof. The cam 52 is provided with a radial slot 5, by means of which it is mounted on shaft 4 for rotation therewith, it being noted that the cam 52 is mounted eccentrically on the shaft 4 and that by virtue of the slot 5, its lateral position with respect to the shaft may be varied, suitable means being provided for securing the cam to the shaft in the desired position.

The cam 52 is of such size as to bear against the iris control arm contact point 10 at all times during its rotation, the spring 9 continually urging the point 10 into contact with the cam. Consequently, rotation of the cam 52 causes lateral movement of the contact point 10 and control arm 3 which results in a variation of the size of the iris 2. The gear connection between the drive shaft of the camera and the shaft 4 may provide various ratios of rotation, one suitable ratio being 2 to 1, whereby two frames of the film are caused to pass the exposure aperture for each revolution of the cam 52, so that one frame is exposed with the iris in its enlarged position, as illustrated for example by circle 6, and the successive frame is exposed through a contracted iris, for example as illustrated by circle 7. It will be understood, of course, that by varying the position of the cam 52 on the shaft 4 or by varying the diameter of the cam, the degree of the iris opening can be varied, and likewise it will be understood that different combinations of gears may be employed for the purpose of providing a different number of frame variations per cycle.

It is essential, however, in all of these variations that the iris opening should always be large enough so that sufficient light is admitted to the camera to provide an adequate exposure of the complete frame area of the film under the particular photographing conditions. For example, it may be desired to vary the iris over three, four, or other number of frames so that a more gradual change is effected, which can be easily accomplished by properly proportioning the gear train. While the limits of variation of iris size may vary widely with different film sensitivities and other photographic conditions, I have found that varying the iris between stops f 2.0 and f 2.5 with the type of cam illustrated at 52 gives very satisfactory results in producing the film of my invention.

As previously mentioned, my invention comprehends various combinations of frames photographed with different iris openings. In Fig. 2, I have illustrated a modified form of cam 53 adapted to be mounted on the shaft 4 in place of the circular cam 52. It will be noted that cam 53 is circular for two-thirds of its perimeter, the other one-third comprising a chord of the circle. The letter T indicates the midpoint of the circular face of the cam and the letters T' and T'' indicate, respectively, the ends of the chord.

By employing the proper gear train and correctly proportioning the cam 53, it can be made to rotate once for every three frames which pass the exposure aperture of the camera. Thus it will be seen that two of the three frames will be exposed while the iris is at a fixed position during the time which the control arm contact point 10 is following the circular portion of the cam T', T and T''. The third frame of the cycle will be exposed at a different iris opening, either larger or smaller as the case may be while the contact point 10 follows the cam surface between T''—T', it being further noted that during this latter exposure, the iris opening will make a complete cycle of wide to narrow to wide, or vice versa, depending upon the correlation between the cam and the control arm 3.

In this manner, I produce a film having two successive frames with the same depth of focus followed by a frame having a different depth of focus. By assembling a plurality of these groups of frames to form a complete picture, I produce a film having a series of images photographed with a certain depth of focus, and another series of images photographed with a different depth of focus, the images of the different series being intermingled, it being understood, of course, that the number of images of either series may predominate over the other.

As is well known to those familiar with the art of photography, an exposure made through a small aperture will have a greater depth of focus than an exposure made through a larger aperture. By thus varying the depth of focus between frames, I provide on the frame exposed through the small aperture an image having more sharpness of contour and in which a greater number of objects in different planes of the field have a relatively distinct contour, while on those frames photographed through the larger aperture, I produce images in which fewer of the objects are clearly defined, and those objects located in planes of the field distant from the plane of focus of the camera are relatively diffused. By employing a cam such as 53, I produce twice as many pictures of one depth of focus as I do pictures of the different depth of focus, and consequently those pictures of the first depth of focus predominate in number and effect upon the eye. In other words, I can produce a film in which the images having greater average diffusion predominate over their counterpart images having greater average sharpness of contour or vice versa.

Furthermore, it will be apparent that the lens may be focused on any desired plane in the field, either foreground, middle ground, or background, and that this plane will always be in focus, even though the relative diffusion of the images may be varied. For example, the camera may be focused on the nearest foreground object which is maintained in sharp definition in all frames, and the definition of the background may be varied between sharpness and diffusion by varying the iris openings as previously explained. Conversely, the camera may be focused on the background, and the foreground images may be fluctuated between sharpness and diffusion on consecutive frames, or the camera may be focused on the plane of the middle ground and both the objects in the foreground and background may be varied in similar manner. I thus produce a film which on projection will vary the depth of focus within a scene of pictures, each individually harmonious, while maintaining a selected depth plane in relatively sharp focus throughout.

Referring now to Fig. 3, it is seen that I have there illustrated another type of cam indicated by the numeral 54 which is adapted to give a non-progressive variation or series of variations among frames. The cam 54 is likewise adapted to be rotated with the shaft 4 with a proper gear train which, for example, may be proportioned so as to cause one complete rotation of the cam 54 for each four frames of film which are exposed at the aperture. The faces A and B may be the same and the faces C and D may be the same, but in this case the cam should be eccentrically mounted on shaft 4 as indicated. The same result may be accomplished by having all of the cam faces different. In either event the order of the aperture sizes produced must be non-progressive. For example, assuming that the cam faces A, B, C, D will produce progressively larger aperture openings, the order of rotation should be A, D, B, C or other combination giving a non-progressive order of exposure aperture. In other words, each of the four frames of the cycle may be photographed through a different iris opening and consequently have a different depth of focus, these depths of focus varying in non-progressive relationships.

By differently shaping and proportioning the cam faces, greater or lesser amounts of variation may be had between successive frames so that any particular type of image may be selected and made to predominate weakly or strongly.

Since it is desirable that the projected images on the screen be of substantially uniform density so as not to cause eye strain by reason of sharp variations in the amounts of light projected on the screen, I prefer to print the negative obtained by my foregoing process in such a manner that the resulting positive obtained therefrom has substantially uniform density throughout. This may be done through use of the methods and apparatus disclosed in my United States Letters Patent No. 2,173,866, issued September 26, 1939, and can easily be done by varying the printing lights so that the frames of the negative which are thin in density are printed with a lower printing light than are the thick density negative frames. By thus recurrently regulating the printing lights, I produce a positive which is substantially uniform in density, but in which the variations in definition present on the negative are carried into the positive so that the plastic effect obtained by my film is retained.

Since in a complete photoplay, there are many scenes and moods, it is possible to produce by my invention individual scenes with different characteristics which will properly portray the required mood, and cause a proper response in the viewer.

As illustrative of one of the many combinations possible, I have shown in Fig. 6 two frames of a film photographed as follows: The upper frame which I term frame 1 has been photographed with both the foreground and background in sharp focus, and frame 2 has been photographed with the background in focus, but the foreground diffused.

While in most instances, I prefer to focus the camera on the background as shown in the drawings, or on the middle background, I may for certain purposes focus the camera on the foreground or other plane in the field, but unless a plural-focal lens or special optical image system is employed, it is always preferably focused on a plane at a reasonable distance behind the foreground object plane.

While the photographic operations heretofore described are very effective and materially add to the naturalness of the picture as a whole, and especially add to the plastic relief of foreground figures on off-focus depth planes, I have found that when the lens focus is fixed and held on any one object throughout the successive exposures, that object will not have the same roundness as the other objects in the picture. Although it may appear separated by the depth introduced into other planes, it remains individually relatively flat compared to those other objects which have various image formations among the several frames, this being particularly so when sharp focus is set on a close-up object. This condition is partially corrected by focusing the lens in space between particular planes, but not all scenes can be so focused on, and when living actors or movement exists within the scene, it becomes desirable to have the object of primary attention in predominating clarity of focus while also, of course, producing the plastic effect.

I have found that this combination can be satisfactorily effected in an ordinary camera provided with my adjustable iris by using a plural-focal optical system in connection therewith, in which an area of the lens system is focused most sharply on a near plane and another area of the lens system is focused most sharply on a more distant plane.

While various kinds of plural-focal lens attachments may be used, I prefer to use an optical combination such as illustrated in Figs. 4 and 5 of the drawing. I provide a strip of thin optical glass 12 immediately behind the rearmost element of the lens and in front of the iris. The strip 12 may be attached to the iris mount in any convenient manner, and preferably in vertical position as shown. The width of the strip 12 is materially less than the diameter of the lens, although vertically it covers the lens while leaving the sides R and L thereof uncovered.

As is well known, the insertion of a glass medium in an optical path serves to move the focal point away from the lens which is the equivalent of moving the film closer to the lens. The plate 12 acts to move the focal point of that part of the lens system C aligned therewith back an amount equal to approximately one-third of the thickness of the plate 12.

The image, formed by the rays passing through the center of the lens and the strip 12, is focused on a plane behind the plane upon which the images formed by the rays passing through the portions R and L of the lens are focused. The result of this combination is that the rays passing through the center C of the lens form a sharp image of background objects on the film, while the rays passing through the lens sides R and L form sharp images of the foreground objects. Thus, in a single exposure through my plural-focal lens with the iris wide open, I produce on a single frame a picture consisting of a plurality of images each of which has the objects of a different plane in sharpest focus.

As one example of the many combinations possible with a plural-focal lens and an adjustable iris, I give the following illustration. Assuming that a cam similar to 52 is used in connection with the iris and a gear train is employed which provides one complete revolution of the cam to every four frames of film exposed, it will be evident that the iris opening will vary in position between circles 6 and 7 as illustrated in Fig. 1. If frame 1 of the film is exposed with the iris expanded, as shown by circle 6, then frame 3 will be exposed with the iris in the contracted position of circle 7. Frames 2 and 4 will be exposed at intermediate positions of the iris aperture. The result will be that frame 1 will bear a compound plural-focal image made up of the three images photographed through the portions C, L and R of the lens, frame 3 will have a single sharp focus taken only through the portion C of the lens, while frames 2 and 4 will each have images photographed through the portions C of the lens, and lighter images produced through the portions R and L of the lens. Thus it will be seen that when the frames are projected, a composite picture is produced on the screen which has an illusion of natural depth throughout.

While I have described my invention as adapted for use with a motion picture camera suitable for ordinary action shots, it will be understood, of course, that my invention is equally applicable to stop motion photography such as is commonly used in the production of animated cartoons, miniatures, still life, lettered titles, and the like. When employing the method of my invention in this type of photography, no special type of apparatus is needed for adjustment or variation of the iris, or for moving the camera as the case may be, since the adjustments may be made manually between exposures. Likewise, I preferably photograph all of the frames directly to a uniform density, irrespective of the variations in the iris aperture. I control the timing to reciprocally vary the duration of exposure by varying the amount of shutter opening for the various exposures to compensate for the variations in aperture size. It will be understood, of course, that the same range of combinations is possible in stop motion photography as is possible in action photography of the type heretofore dealt with, and that the film of my invention produced by this means is similar to that produced by the methods previously set forth.

While I have given numerous specific examples of my invention, it is to be understood that they are by way of illustration only, and that my invention is not to be restricted thereto, but is to be afforded the full scope of the appended claims.

I claim:

1. The method of producing a cinematographic film having a plurality of intermingled images of different series aligned thereon, which film upon projection will produce a motion picture having the illusion of depth, which includes: varying the depth of focus of the camera during the production of said images so that the images of one series are exposed with a depth of focus different from that used for another series of images, and adjusting the duration of exposure of said film to maintain each of the images of each of said series in substantially uniform average density.

2. The method of producing a cinematographic film having a plurality of intermingled images of different types aligned thereon, which film upon projection will produce a motion picture having the illusion of depth, which includes: varying the depth of focus of the camera during the production of said images by changing the size of the exposure aperture of the camera so that framed images of one type are exposed with a depth of focus different from that used for framed images of another type, and adjusting the duration of exposure in accordance with the change in size of the exposure aperture to produce on said film images of substantially uniform average density.

3. The method of producing a cinematographic film having a plurality of intermingled images of different series aligned thereon, which film upon projection will produce a motion picture having the illusion of depth, which includes: exposing said film through a camera lens partially covered by an optical element which modifies the length of the optical path of that portion of the lens which it covers, whereby differing components of a local image are differently diffused, and varying the depth of focus of the lens during the production of said images so that the images of one series are exposed with a depth of focus different from that used for another series of images.

4. The method of producing a cinematographic film having a plurality of intermingled images of different series aligned thereon, which film upon projection will produce a motion picture having the illusion of depth, which includes: exposing said film through a camera lens which has extended substantially vertically across a central portion thereof a refractor having plane parallel faces whereby different areas of the lens are differently focused, and varying the depth of focus of the camera during the production of said images so that the images of one series are exposed with a depth of focus different from that used for another series of images.

5. The method of producing a cinematographic film having a plurality of intermingled images of different series aligned thereon, which film upon projection will produce a motion picture having the illusion of blended depth, which includes: varying the depth of focus of the camera during the production of said images by non-progressively varying the size of the exposure aperture of the camera so that the images of one series are exposed with a depth of focus different from that used for another series of images, and adjusting the time of exposure in accordance with the change in size of the exposure aperture to produce on said film images of substantially uniform average density.

6. The method of producing a cinematographic film having a plurality of intermingled images of different series aligned thereon, which film upon projection will produce a motion picture having the illusion of depth, which includes: varying the depth of focus of the camera during the production of said images so that the images of one series are exposed with a depth of focus different from but including that used for another series of images, and adjusting the duration of exposure of said film to maintain each of the images of each of said series in substantially uniform average density.

7. The method of producing a cinematographic film having a plurality of intermingled images of different series aligned thereon, which film upon projection will produce a motion picture having the illusion of depth, which includes: focusing a motion picture camera upon a foreground object of the scene to be photographed, varying the depth of focus of the camera during the production of said images so that the images of one series are exposed with a depth of focus different from that used for another series of images, and adjusting the duration of exposure of said film to maintain each of the images of each of said series in substantially uniform average density.

8. The method of producing a cinematographic film having a plurality of intermingled images of different series aligned thereon, which film upon projection will produce a motion picture having the illusion of depth, which includes: focusing a motion picture camera upon a background object of the scene to be photographed, varying the depth of focus of the camera during the production of said images so that the images of one series are exposed with a depth of focus different from that used for another series of images, and adjusting the duration of exposure of said film to maintain each of the images of each of said series in substantially uniform average density.

IVAN M. TERWILLIGER.